US012732337B2

(12) United States Patent
Wang et al.

(10) Patent No.: US 12,732,337 B2
(45) Date of Patent: Sep. 8, 2026

(54) TRANSMISSION CONTROL METHOD UNDER TIME DOMAIN RESOURCE COLLISION, AND, APPARATUS, TERMINAL, AND READABLE STORAGE MEDIUM

(71) Applicant: VIVO MOBILE COMMUNICATION CO., LTD., Dongguan (CN)

(72) Inventors: Lihui Wang, Dongguan (CN); Xueming Pan, Dongguan (CN); Kai Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 271 days.

(21) Appl. No.: 18/388,671

(22) Filed: Nov. 10, 2023

(65) Prior Publication Data

US 2024/0080174 A1 Mar. 7, 2024

Related U.S. Application Data

(63) Continuation of application No. PCT/CN2022/091937, filed on May 10, 2022.

(30) Foreign Application Priority Data

May 10, 2021 (CN) ......................... 202110506234.3
May 11, 2021 (CN) ......................... 202110513620.5

(51) Int. Cl.
*H04L 5/16* (2006.01)
*H04W 74/0816* (2024.01)

(52) U.S. Cl.
CPC ........... *H04L 5/16* (2013.01); *H04W 74/0816* (2013.01)

(58) Field of Classification Search
CPC ....... H04L 5/16; H04L 5/0053; H04L 5/1469; H04L 5/00; H04L 5/14; H04W 74/0816;
(Continued)

(56) References Cited

U.S. PATENT DOCUMENTS 10,333,670 B2 6/2019 Rico Alvarino et al.
10,404,443 B2 9/2019 Sakhnini et al.
(Continued)

FOREIGN PATENT DOCUMENTS

CN 1835432 A 9/2006
CN 104254989 A 12/2014
(Continued)

OTHER PUBLICATIONS

NTT Docomo, Inc., "Discussion on duplex operation for RedCap", 3GPP TSG RAN WG1 #104bis-e, e-Meeting, Apr. 12-20, 2021, R1-2103585.

(Continued)

*Primary Examiner* — Ivan O Latorre
(74) *Attorney, Agent, or Firm* — The Webb Law Firm

(57) ABSTRACT

A transmission control method includes in a case that a resource collision exists between uplink transmission and downlink transmission of a terminal in time domain, obtaining, by the terminal, target information; and performing, by the terminal, a corresponding terminal behavior based on the target information, where the terminal is a terminal having an HD-FDD capability, and the target information includes at least one of the following: a configuration of a base station or a processing capability of the terminal.

15 Claims, 5 Drawing Sheets

In a case that a resource collision exists between uplink transmission and downlink transmission of a terminal in time domain, the terminal obtains target information — 201

↓

The terminal performs a corresponding terminal behavior based on the target information — 202

(58) Field of Classification Search
CPC ........... H04W 72/1268; H04W 72/232; H04W 74/0833; H04W 8/22; H04W 28/04
See application file for complete search history.

(56) References Cited

U.S. PATENT DOCUMENTS

| | | | | |
|---|---|---|---|---|
| 10,771,204 | B2 | 9/2020 | Chen et al. | |
| 2015/0016310 | A1 | 1/2015 | Yi et al. | |
| 2016/0270083 | A1* | 9/2016 | Zeng | H04W 74/08 |
| 2017/0141861 | A1* | 5/2017 | Zhang | H04W 4/40 |
| 2018/0054833 | A1 | 2/2018 | Ji et al. | |
| 2019/0173598 | A1* | 6/2019 | Nose | H04J 3/1694 |
| 2021/0029737 | A1 | 1/2021 | Pan et al. | |
| 2021/0067992 | A1 | 3/2021 | Kusashima et al. | |
| 2022/0029756 | A1* | 1/2022 | Sarkis | H04W 72/20 |
| 2022/0030603 | A1* | 1/2022 | Sarkis | H04L 1/1887 |
| 2023/0345454 | A1* | 10/2023 | Nguyen | H04W 72/0446 |
| 2024/0244588 | A1* | 7/2024 | Yoshioka | H04W 28/26 |
| 2025/0113369 | A1* | 4/2025 | Yoshioka | H04W 72/25 |
| 2025/0274960 | A1* | 8/2025 | He | H04W 72/02 |
| 2025/0301485 | A1* | 9/2025 | He | H04W 72/25 |

FOREIGN PATENT DOCUMENTS

| | | | |
|---|---|---|---|
| CN | 106464452 | A | 2/2017 |
| CN | 109478965 | A | 3/2019 |
| CN | 110249677 | A | 9/2019 |
| CN | 111130727 | A | 5/2020 |
| CN | 111406436 | A | 7/2020 |
| CN | 110249677 | B | 12/2020 |
| WO | 2013138715 | A1 | 9/2013 |
| WO | 2015060620 | A1 | 4/2015 |

OTHER PUBLICATIONS

Vivo et al., “Discussion on RedCap half-duplex operation”, 3GPP TSG RAN WG1 #104bis-e, e-Meeting, Apr. 12-20, 2021, R1-2102531.

* cited by examiner

TRANSMISSION CONTROL METHOD UNDER TIME DOMAIN RESOURCE COLLISION, AND, APPARATUS, TERMINAL, AND READABLE STORAGE MEDIUM

CROSS-REFERENCE TO RELATED APPLICATIONS

This application is a Bypass Continuation Application of International Patent Application No. PCT/CN2022/091937, filed May 10, 2022, and claims priority to Chinese Patent Application Nos. 202110506234.3, filed May 10, 2021, and 202110513620.5, filed May 11, 2021, the disclosures of which are hereby incorporated by reference in their entireties.

BACKGROUND OF THE INVENTION

Field of the Invention

This application pertains to the field of communications technologies, and relates to a transmission control method and apparatus, a terminal, and a readable storage medium.

Description of Related Art

In response to requirements of vertical industries, in application scenarios of industrial wireless sensors, video surveillance, and wearable devices, complexity of a terminal needs to be reduced in terms of a quantity of receive antennas, a quantity of transmit antennas, a supported bandwidth, the time and capability of the terminal to process data and signals, and the like. This type of terminal is referred to as a reduced-capability terminal (RedCap device/UE for short). Some RedCap UEs do not have full-duplex capabilities.

SUMMARY OF THE INVENTION

Embodiments of this application provide a transmission control method.

According to a first aspect, a transmission control method is provided and is applied to a terminal. The method includes: in a case that a resource collision exists between uplink transmission and downlink transmission of the terminal in time domain, obtaining, by the terminal, target information; and performing, by the terminal, a corresponding terminal behavior based on the target information, where the terminal is a terminal having a half-duplex frequency division duplex HD-FDD capability, and the target information includes at least one of the following: a configuration of a base station or a processing capability of the terminal.

According to a second aspect, a transmission control apparatus is provided. The apparatus includes an obtaining module and an execution module. The obtaining module is configured to obtain target information in a case that a resource collision exists between uplink transmission and downlink transmission of a terminal in time domain. The execution module is configured to perform a corresponding terminal behavior based on the target information obtained by the obtaining module, where the terminal is a terminal having a half-duplex frequency division duplex HD-FDD capability, and the target information includes at least one of the following: a configuration of a base station or a processing capability of the terminal.

According to a third aspect, a terminal is provided. The terminal includes a processor, a memory, and a program or instructions stored in the memory and executable on the processor. When the program or instructions are executed by the processor, the steps of the method according to the first aspect are implemented.

According to a fourth aspect, a terminal is provided. The terminal includes a processor and a communications interface. The processor is configured to obtain target information in a case that a resource collision exists between uplink transmission and downlink transmission of the terminal in time domain. The communications interface is configured to perform a corresponding terminal behavior based on the target information.

According to a fifth aspect, a non-transitory readable storage medium is provided. The non-transitory readable storage medium stores a program or instructions. When the program or instructions are executed by a processor, the steps of the method according to the first aspect are implemented.

According to a sixth aspect, a chip is provided. The chip includes a processor and a communications interface. The communications interface is coupled to the processor. The processor is configured to run a program or instructions to implement the method according to the first aspect.

According to a seventh aspect, a computer program or a program product is provided. The computer program or program product is stored in a non-volatile storage medium. The computer program or program product is executed by at least one processor to implement the steps of the transmission control method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figure 1:
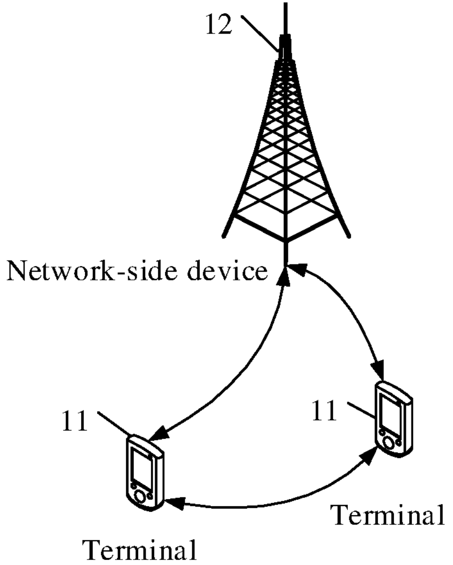
FIG. 1 is a structural diagram of a wireless communications system to which an embodiment of this application can be applied.

FIG. 1 is a structural diagram of a wireless communications system to which an embodiment of this application may be applied. The wireless communications system includes a terminal 11 and a network-side device 12. The terminal 11 may also be referred to as a terminal device or a user terminal (UE). The terminal 11 may be a terminal-side device such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device, a vehicular user equipment (VUE), or a pedestrian user equipment (PUE). The wearable device includes a smart watch, a smart band, an earphone, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

Frequency division duplex (FDD) is a full-duplex communications technology used in a mobile communications system, and corresponds to time division duplex (TDD). FDD is a technology that uses two independent channels for downlink and uplink transmission of information respectively. To prevent neighboring transmitters and receivers from interfering with each other, a guard band exists between the two channels. In a time division duplex TDD operation, a same carrier frequency is used for downlink (DL) transmission and uplink (UL) transmission. Therefore, a device can only perform downlink reception and uplink transmission at different times.

An existing protocol specifies behaviors of uplink transmission and downlink transmission in a TDD system. However, because the uplink transmission and downlink transmission in the TDD system use carriers of a same frequency, and signal strength of a downlink signal sent by a base station is far greater than that of an uplink signal sent by a terminal, when the base station sends a downlink signal to the terminal, the terminal is unable to send an uplink signal due to severe interference from the downlink signal sent by the base station. Therefore, the specification in the existing protocol on uplink transmission and downlink transmission in the TDD system is not applicable to the FDD system.

To ensure normal communication of RedCap UE in an FDD system, it is necessary to specify a time position for switching of uplink/downlink transmission or reception of the RedCap UE, and impact of the switching time on current and subsequent transmission or reception. In addition, considering the switching time, it is also necessary to specify behaviors of processing a resource collision between uplink transmission and downlink transmission by the RedCap UE and validating a valid occasion for a physical random access channel (PRACH) or a physical uplink shared channel (PUSCH) in a two-step random access message MsgA. However, a transmission behavior of a reduced-capability terminal in the FDD system has not been specified in current communication standards.

Based on this, an embodiment of this application provides a transmission control method applicable to an FDD system, to meet a transmission requirement of a reduced-capability terminal.

The following describes a transmission control method provided in the embodiments of this application by using some embodiments and application scenarios thereof with reference to the accompanying drawings.

Figure 2:
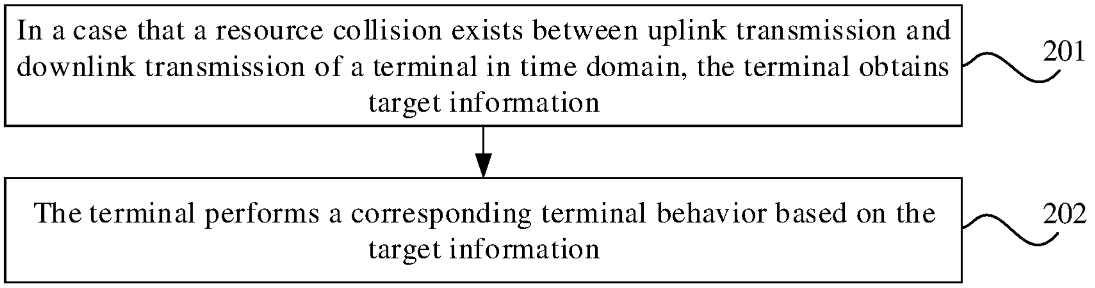
FIG. 2 is a schematic flowchart of a transmission control method according to an embodiment of this application.

As shown in FIG. 2, a transmission control method provided in an embodiment of this application includes the following step 201 and step 202.

Step 201: In a case that a resource collision exists between uplink transmission and downlink transmission of a terminal in time domain, the terminal obtains target information.

For example, the terminal is a terminal having a half-duplex frequency division duplex HD-FDD capability, and in half-duplex frequency division duplex work mode, the terminal can perform uplink transmission and downlink transmission on carriers of different frequencies. However, limited by a capability of the terminal, the terminal is unable to perform uplink transmission and downlink transmission simultaneously. In a case that the terminal has a resource on which uplink transmission and downlink transmission need to be performed simultaneously at a time, the terminal needs to choose to perform uplink transmission or downlink transmission.

For example, the downlink transmission of the terminal may include any one of the following: downlink transmission dynamically scheduled by a downlink control information (DCI) format, a downlink symbol (which may also be referred to as a downlink transmission direction) or a flexible symbol (which may also be referred to as a flexible transmission direction) indicated by a DCI format, a synchronization signal and physical broadcast channel block (SSB), a control resource set (CORESET) associated with a common search space (CSS) set of a physical downlink control channel (PDCCH) configured by a PDCCH-ConfigSIB1 in a master information block (MIB), a terminal-specific downlink transmission configuration, and the like.

For example, the downlink transmission dynamically scheduled by the DCI format may include: a physical downlink shared channel (PDSCH), a channel state information reference signal (CSI-RS), a positioning reference signal (PRS), a tracking reference signal (TRS), and the like.

For example, the terminal-specific downlink configuration may include: PDCCH monitoring, an SPS PDSCH, a CSI-RS, and a TRS.

For example, the uplink transmission of the terminal may include any one of the following: a valid RACH Occasion (RO) for a physical random access channel (PRACH), uplink transmission dynamically scheduled by a DCI format, or a flexible transmission direction dynamically indicated by a DCI format.

For example, the uplink transmission dynamically scheduled by the DCI format or the flexible transmission direction dynamically indicated by the DCI format may include a PRACH triggered by PDCCH order, a PUSCH, a PUCCH, a sounding reference signal (SRS), a DCI format 2_0 indicating UL or flexible, or the like.

Step 202: The terminal performs a corresponding terminal behavior based on the target information.

The target information includes at least one of the following: a configuration of a base station or a processing capability of the terminal.

For example, the configuration of the base station may determine a frequency, strength, and the like of a signal currently sent by the base station, that is, the terminal may determine, based on the configuration of the base station, a downlink signal that the terminal is able to receive. The configuration of the base station may also configure behaviors of the base station and the terminal. The processing capability of the terminal includes a capability of processing signals of different frequency bands by the terminal, and a capability of processing data by the terminal.

For example, after obtaining the target information, the terminal may perform the corresponding terminal behavior based on the target information, and the terminal behavior may include: performing uplink transmission and downlink transmission. In other words, the terminal may determine, based on the target information, to perform uplink transmission or downlink transmission.

For example, the terminal may perform different terminal behaviors based on the target information in different cases of resource collisions between uplink transmission and downlink transmission in time domain, thereby meeting a transmission requirement of the reduced-capability terminal and improving stability of communication.

In this way, in the case that the resource collision exists between the uplink transmission and the downlink transmission of the half-duplex frequency division duplex terminal in time domain, after the terminal obtains the target information, the terminal performs, based on the configuration of the base station and/or the processing capability of the terminal included in the target information, the terminal behavior corresponding to the target information, so that when the resource collision exists between the uplink transmission and the downlink transmission of the reduced-capability terminal in time domain, the terminal can select an appropriate transmission behavior. Therefore, communication stability and transmission efficiency of the terminal are improved.

Optionally, in this embodiment of this application, the following examples in which a resource collision exists between uplink transmission and downlink transmission of the reduced-capability terminal in time domain are provided.

Example 1

In the example 1, the uplink transmission of the terminal includes a physical random access channel PRACH. Optionally, the uplink transmission of the terminal includes a valid RO for the PRACH. The downlink transmission of the terminal may include any one of the following: downlink transmission dynamically scheduled by a DCI format; a downlink symbol indicated by a DCI format; and a flexible symbol indicated by a DCI format.

For example, in the example 1, the following two collisions may be included: ① a resource collision exists between the physical random access channel PRACH of the terminal and the downlink transmission dynamically scheduled by the DCI format in time domain; and ② a resource collision exists between the physical random access channel PRACH of the terminal and the downlink symbol or the flexible symbol indicated by the DCI format in time domain.

For the collision ①: a resource overlap of at least one symbol exists between the valid RO valid RO for the PRACH of the terminal and DL reception dynamically scheduled by a DCI format (a DCI format 1_0, a DCI format 1_1, a DCI format 0_1, a DCI format 1_2, or DCI format 0_2 indicating to the UE to receive a CSI-RS or PDSCH).

For example, in the foregoing resource collision case, the terminal behavior may include at least one of the following:

Op1-1: If the terminal does not indicate support for a partial cancellation capability, step 202 may include the following step 202*a* or step 202*b*.

Step 202*a*: If the terminal meets a timeline for canceling the entire uplink transmission, the terminal receives the downlink transmission, and cancels transmission of the PRACH; otherwise, the terminal does not receive the downlink transmission.

For example, in step 202*a*, when the terminal does not receive the downlink transmission, the terminal may transmit the PRACH, or may not transmit the PRACH.

Step 202*b*: If the terminal meets a timeline for canceling the entire uplink transmission, the terminal does not receive the downlink transmission, and does not transmit the PRACH; otherwise, the terminal does not receive the downlink transmission.

For example, in step 202*a* and step 202*b*, if the terminal does not meet the timeline for canceling the entire uplink transmission, when the terminal does not receive the downlink transmission, the terminal may transmit the PRACH, or may not transmit the PRACH.

That the terminal meets a timeline for canceling the entire uplink transmission includes: a difference between a time when the terminal transmits a first symbol of the PRACH and a time when the terminal detects a last symbol of a target CORESET is greater than or equal to target duration. In other words, after receiving the last symbol of the target CORESET, the terminal has enough time to cancel transmission of the entire PRACH.

For example, if the terminal does not indicate support for the partial transmission capability, the terminal can only choose to transmit the entire PRACH or skip transmission or cancel transmission of the entire PRACH, and is unable to transmit only a part of the PRACH. In this case, if the terminal does not meet the timeline for canceling the entire uplink transmission, the terminal may transmit the PRACH and does not receive the downlink transmission. If the terminal meets the timeline for canceling the entire uplink transmission, the terminal may cancel transmission of the PRACH, and receive the downlink transmission.

Figure 3A:
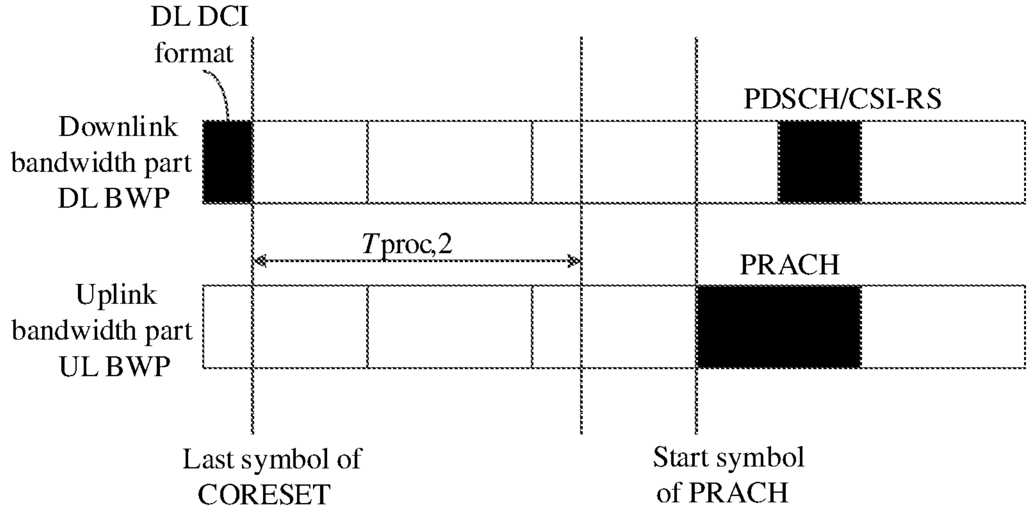
FIG. 3A is a first schematic diagram of an application scenario of a transmission control method according to an embodiment of this application.
Figure 3B:
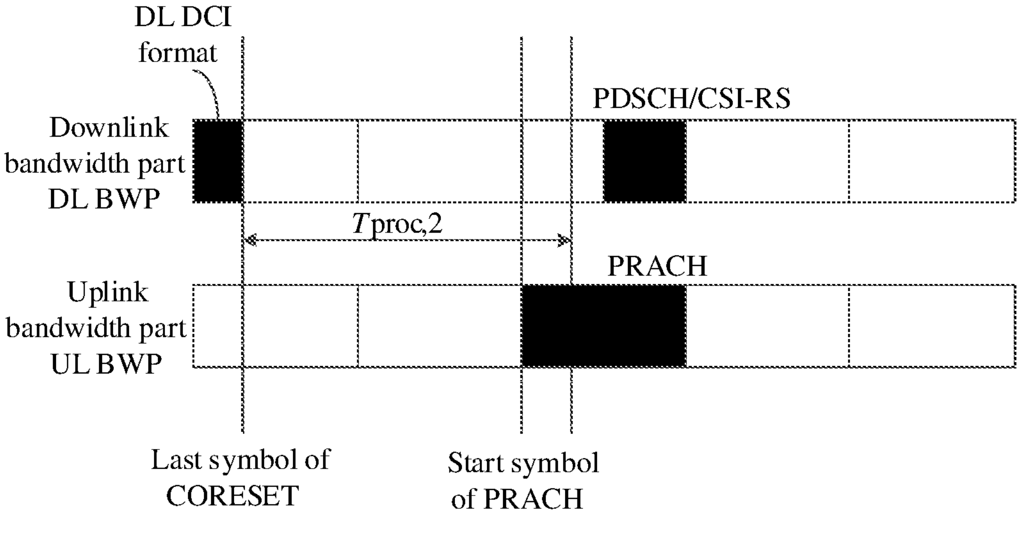
FIG. 3B is a second schematic diagram of an application scenario of a transmission control method according to an embodiment of this application.

For example, using step 202*a* as an example, as shown in FIG. 3A and FIG. 3B, which is a schematic diagram of an uplink bandwidth and a downlink bandwidth of the terminal in time domain, the terminal does not have the partial cancellation capability. As shown in FIG. 3A, the PRACH does not have a symbol within a time Tproc,2 after a last symbol of a CORESET. In this case, the terminal has a capability of canceling the entire uplink transmission. In this case, the terminal cancels transmission of the PRACH or does not transmit the PRACH, and receives the downlink transmission (PDSCH/CSI-RS).

As shown in FIG. 3B, some symbols of the PRACH are located within the time Tproc,2 after the last symbol of the CORESET. In this case, the terminal does not have the capability of canceling the entire uplink transmission. Therefore, the terminal transmits the PRACH and does not receive the downlink transmission.

Opt1-2: If the terminal indicates support for a partial cancellation capability, step 202 may include any one of the following step 202*cl* to step 202*c*4.

Step 202*c*1: If the terminal meets a timeline for canceling the entire uplink transmission, the terminal does not receive the downlink transmission, and cancels transmission of the PRACH; otherwise, the terminal does not receive the downlink transmission.

For example, in step 202*c*1, if the terminal does not meet the timeline for canceling the entire uplink transmission, when the terminal does not receive the downlink transmission, the terminal may transmit the PRACH, or may not transmit the PRACH.

Step 202*c*2: If the terminal does not meet a timeline for canceling the entire uplink transmission, the terminal does not receive the downlink transmission, and cancels transmission of a second-part PRACH; otherwise, the terminal does not receive the downlink transmission.

For example, for a first-part PRACH, if the terminal does not meet the timeline for canceling the entire uplink transmission, the terminal may transmit the first-part PRACH or may not transmit the first-part PRACH.

For example, in step 202*c*2, if the terminal meets the timeline for canceling the entire uplink transmission, when the terminal does not receive the downlink transmission, the terminal may transmit the PRACH, or may not transmit the PRACH.

Step 202*c*3: If the terminal meets a timeline for canceling the entire uplink transmission, the terminal receives the downlink transmission, and cancels transmission of the PRACH; otherwise, the terminal does not receive the downlink transmission.

For example, in step 202*c*3, if the terminal does not meet the timeline for canceling the entire uplink transmission, when the terminal does not receive the downlink transmission, the terminal may transmit the PRACH, or may not transmit the PRACH.

Step 202*c*4: If the terminal does not meet a timeline for canceling the entire uplink transmission, the terminal receives the downlink transmission, and cancels transmission of a second-part PRACH; otherwise, the terminal does not receive the downlink transmission.

For example, for a first-part PRACH, if the terminal does not meet the timeline for canceling the entire uplink transmission, the terminal may transmit the first-part PRACH or may not transmit the first-part PRACH.

For example, in step 202*c*4, if the terminal meets the timeline for canceling the entire uplink transmission, when the terminal does not receive the downlink transmission, the terminal may transmit the PRACH, or may not transmit the PRACH.

For example, the PRACH includes the first-part PRACH and the second-part PRACH. The first-part PRACH includes symbols of the PRACH in a target time period; duration of the target time period is target duration, and the target duration is Tproc,2; a start point of the target time period is a last symbol of a target CORESET; the target CORESET includes either of the following: a CORESET in which a downlink symbol or a flexible symbol indicated by a DCI format detected by the terminal is located and a CORESET in which downlink transmission scheduled by a DCI format detected by the terminal is located; and the second-part PRACH includes: a PRACH part other than the first-part PRACH in the PRACH.

For example, if the terminal indicates support for the partial cancellation capability, the terminal may transmit only a part of the PRACH. In this case, if the terminal meets the timeline for canceling the entire uplink transmission, that is, if the first-part PRACH exists, the terminal may receive the downlink transmission after transmitting the first-part PRACH, and cancel transmission of the second-part PRACH; or if the terminal does not meet the timeline for canceling the entire uplink transmission, that is, if the first-part PRACH does not exist, the terminal may cancel transmission of the entire PRACH and receive the downlink transmission.

Figure 4A:
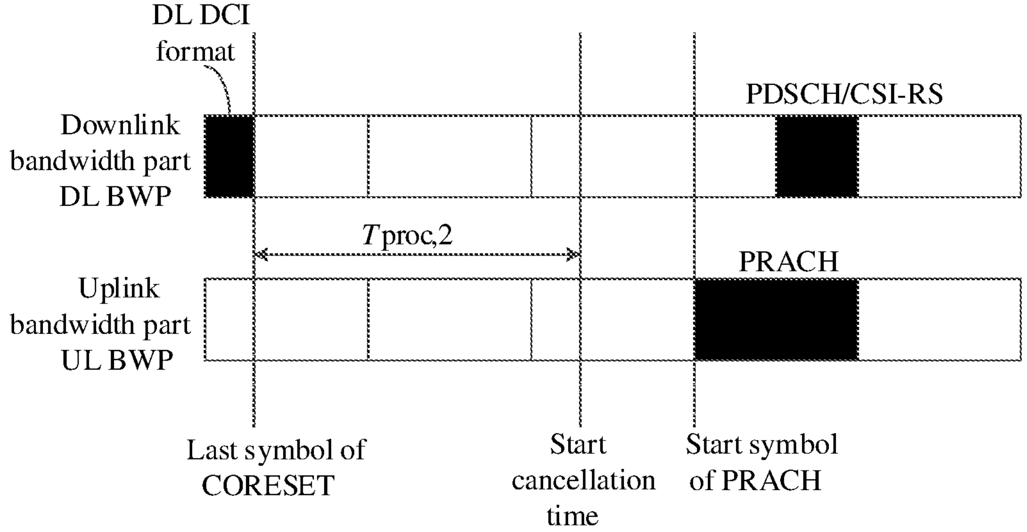
FIG. 4A is a third schematic diagram of an application scenario of a transmission control method according to an embodiment of this application.
Figure 4B:
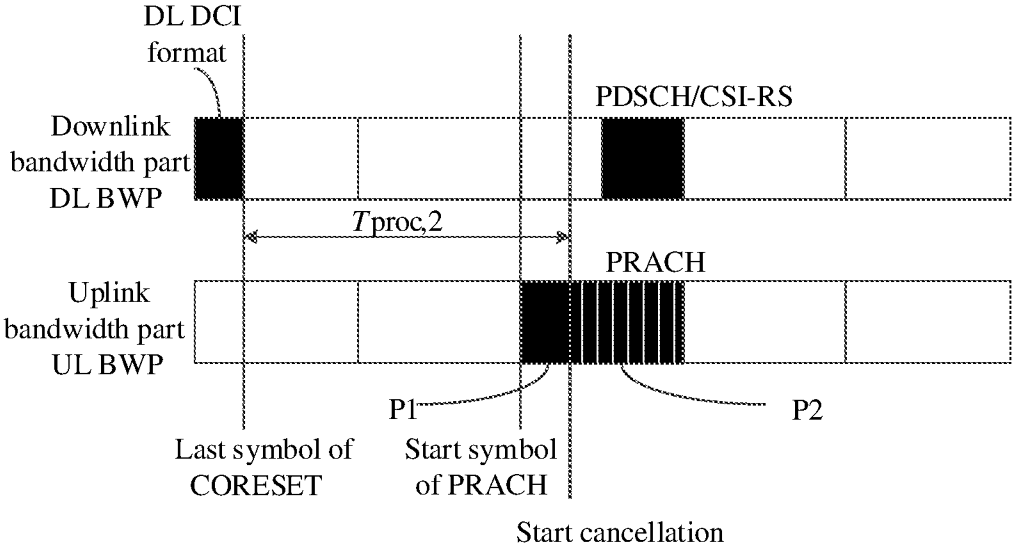
FIG. 4B is a fourth schematic diagram of an application scenario of a transmission control method according to an embodiment of this application.

For example, using step 202*c*2 as an example, as shown in FIG. 4A and FIG. 4B, which is a schematic diagram of an uplink bandwidth and a downlink bandwidth of the terminal in time domain, the terminal has the partial cancellation capability. As shown in FIG. 4A, the PRACH does not have a symbol within a time Tproc,2 after a last symbol of a CORESET. In this case, the terminal has a capability of canceling the entire uplink transmission. In this case, the terminal transmits the PRACH, and does not receive the downlink transmission (PDSCH/CSI-RS).

As shown in FIG. 4B, some symbols (P1) of the PRACH are located within the time Tproc,2 after the last symbol of the CORESET. In this case, the terminal does not have the capability of canceling the entire uplink transmission. Therefore, the terminal transmits a P1 part of the PRACH (a part before a start cancellation time) and cancels transmission of a P2 part of the PRACH (a part after the start cancellation time), and the terminal does not receive the downlink transmissions either.

Opt1-3: Depending on implementation of the terminal, the terminal may determine to transmit the PRACH or receive the downlink transmission.

For example, the terminal may preferentially transmit the PRACH to maintain a connection to the base station; or may randomly determine to transmit the PRACH or receive the downlink transmission. Optionally, the terminal may preferentially receive the downlink transmission within a preset time after successful transmission of the PRACH, and preferentially transmit the PRACH after a preset time upon successful transmission of the PRACH.

Opt1-4: If a resource collision exists between downlink transmission and uplink transmission of the terminal in time domain, the terminal may consider that the resource collision is caused by wrong scheduling of the network.

For example, to avoid the resource collision, the terminal does not expect that a resource overlap of at least one symbol exists between the downlink transmission configured by the received DCI format and the uplink transmission; and/or the terminal does not expect that a resource overlap of at least one symbol exists between a downlink transmission direction indicated by the received DCI format and the uplink transmission; and/or the terminal does not expect that a resource overlap of at least one symbol exists between the flexible symbol indicated by the received DCI format and the uplink transmission.

For the collision ②: a resource overlap of at least one symbol exists between the valid RO for the PRACH and a downlink transmission direction or a flexible transmission direction indicated by a DCI format 2_0. In this case, the terminal behavior may include at least one of the following:

Opt2-1: If the terminal does not indicate support for a partial cancellation capability, the terminal behavior is consistent with the terminal behavior in Opt1-1.

Opt2-2: If the terminal indicates support for a partial cancellation capability, the terminal behavior is consistent with the terminal behavior in Opt2-1.

Opt2-3: Depending on implementation of the terminal, the terminal may determine to transmit the PRACH or receive the downlink transmission, and the terminal behavior is consistent with the terminal behavior in Opt1-3.

Opt2-4: If a resource collision exists between downlink transmission and uplink transmission of the terminal in time domain, the terminal may consider that the resource collision is caused by wrong scheduling of the network.

For example, to avoid the resource collision, the terminal does not expect that a resource overlap of at least one symbol exists between the downlink transmission configured by the received DCI format and the uplink transmission; and/or the terminal does not expect that a resource overlap of at least one symbol exists between a downlink transmission direction indicated by the received DCI format and the uplink transmission; and/or the terminal does not expect that a resource overlap of at least one symbol exists between the flexible symbol indicated by the received DCI format and the uplink transmission.

It should be noted that the terminal behaviors of the terminal for collisions ① and ②, that is, the terminal behaviors of the terminal in Opt1-1 to Opt1-4, and Opt2-1 to Opt2-4, are also applicable to a Rel-17 non-RedCap device in a TDD system.

Example 2

In the example 2, the uplink transmission of the terminal includes a valid RO for a PRACH. The downlink transmission of the terminal includes a synchronization signal and physical broadcast channel block SSB.

For example, for a resource collision between the valid RO for the PRACH and the SSB, the terminal behavior may include any one of the following:

Opt3-1: In a case that a preset condition is met, the terminal receives the SSB and does not transmit the PRACH. Otherwise, the terminal does not receive the SSB, and may send the PRACH, or the terminal may determine, depending on implementation of the terminal, whether to receive the SSB or send the PRACH.

For example, step 202 may include the following step 202*d*.

Step 202*d*: In a case that the SSB meets at least one of the following, the terminal receives the downlink transmission, and does not perform the uplink transmission; otherwise, the terminal does not receive the downlink transmission:

the SSB is a synchronization signal and physical broadcast channel block (that is, ssb-PositionsInBurst in SIB1 or ssb-PositionsInBurst in ServingCellConfigCommon) indicated by the base station for the terminal by using a system information block SIB1;

or the SSB is an SSB configured by an SSB measurement timing configuration (SSB-MTC).

For example, if the SSB does not meet either of the foregoing, the terminal does not receive the downlink transmission. In this case, the terminal may transmit the PRACH; or whether to transmit the PRACH or receive the downlink SSB is determined by the terminal.

Opt3-2: The terminal may preferentially receive the SSB. In this case, it is considered that a resource overlap of at least one symbol exists between the valid RO for the PRACH and the SSB, and the valid RO for the PRACH is no longer a valid RO for the PRACH.

It should be noted that the valid RO for the PRACH is defined for the terminal in the TDD system. For an HD-FDD terminal working in an FDD system, a PRACH of the HD-FDD terminal complies with the definition of the valid RO for the PRACH for the terminal in the TDD system. However, in this case, a resource overlap of at least one symbol exists between the PRACH and the SSB. Therefore, the valid RO for the PRACH is no longer considered as the valid RO for the PRACH in the FDD system.

For example, in a case that a separate initial UL BWP is configured for the terminal, it is considered that a random access channel opportunity RO having a resource overlap with the SSB is no longer valid.

For example, step 202 may include the following step 202*e*.

Step 202*e*: In a case that the uplink transmission does not include the valid RO for the PRACH, the terminal preferentially receives the SSB.

For example, if a resource overlap of at least one symbol exists between the PRACH and the SSB, the terminal may preferentially receive the SSB.

Opt3-3: The terminal may always preferentially transmit the PRACH.

For example, step 202 may include the following step 202*f*.

Step 202*f*: The terminal preferentially performs the uplink transmission based on the processing capability of the terminal.

For example, if the processing capability of the terminal is poor and it needs to take a long time to process the terminal behavior in Opt3-1 or Opt3-2, the terminal may directly transmit the PRACH without performing determining.

Opt3-4: Depending on implementation of the terminal, the terminal may determine to transmit the PRACH or receive the SSB.

For example, the terminal may determine the terminal behavior based on the processing capability of the terminal and/or the configuration of the base station.

Example 3

In the example 3, a resource collision exists between valid RO for a PRACH and a control resource set (CORESET) configured by system information (MIB and/or SIB1) for a common search space (CSS) in time domain. For the resource collision in the example 3, the terminal behavior may include any one of the following:

Opt4-1: The uplink transmission of the terminal may include the valid RO for the PRACH. The downlink transmission of the terminal may include the control resource set CORESET configured by the system information for the common search space CSS.

For example, step 202 may include the following step 202*g*.

Step 202*g*: If the CORESET is associated with at least one of the following CSSs, the terminal monitors a physical downlink control channel PDCCH in the CORESET, and does not send the PRACH; otherwise, the terminal does not monitor the CORESET.

For example, the CSS associated with the CORESET is at least one of the following:

a Type0 PDCCH CSS;

a Type0A PDCCH CSS;

a Type1 PDCCH CSS; or a Type2 PDCCH CSS.

For example, for the Type0 PDCCH CSS or Type0A PDCCH CSS, if the network indicates an update of the system information, the terminal does not transmit the PRACH.

For example, in a case that a resource collision exists between a paging occasion (PO) determined by the terminal based on a UE-ID and the valid RO for the PRACH, the terminal does not send the PRACH.

For example, the CORESET includes at least one of the following: a CORESET for Type0-PDCCH CSS set configured by pdcch-Config SIB1 in MIB; or a common control resource set configured by PDCCH-Config Common in SIB1.

For example, if the terminal does not monitor the CORESET, the terminal may transmit the PRACH, or depending on implementation of the terminal, the terminal may determine to transmit the PRACH or monitor the CORESET.

Opt4-2: The terminal always monitors the CORESET, and in this case, it is considered that the PRACH having a resource overlap with the CORESET is no longer a valid RO.

For example, in a case that a separate initial UL BWP is configured for the terminal, it is considered that a random access channel occasion RO having a resource overlap with the CORESET is no longer valid.

Opt4-3: The terminal always preferentially transmits the PRACH.

For example, the terminal preferentially performs the uplink transmission based on the processing capability of the terminal. This is consistent with the terminal processing behavior in Opt3-3. In other words, in a case that the processing capability of the terminal is poor, the terminal always preferentially transmits the PRACH.

Opt4-4: Whether the terminal monitors the CORESET or sends (or preferentially sends) the PRACH depends on implementation of the terminal.

Opt4-5: If the terminal needs to monitor, in the control resource set (CORESET) in the common search space (CSS), a physical downlink control channel PDCCH scrambled by a radio network temporary identifier (RNTI), the terminal preferentially monitors the PDCCH, and does not send the PRACH.

For example, step 202 may further include the following step 202*h*.

Step 202*h*: If the CORESET includes a target PDCCH, the terminal preferentially monitors the target PDCCH, and does not transmit the PRACH; otherwise, the terminal does not monitor the target PDCCH.

The target PDCCH is a PDCCH scrambled by at least one of the following radio network temporary identifiers RNTIs:

a paging radio network temporary identifier (P-RNTI);

a system information radio network temporary identifier (SI-RNTI);

a random access radio network temporary identifier (RA-RNTI);

a message B radio network temporary identifier in a two-step random access process (MsgB-RNTI); or a temporary cell radio network temporary identifier (TC-RNTI).

For example, if a resource overlap of at least one symbol exists between the valid RO for the PRACH and the control resource set CORESET configured by the system information (MIB and/or SIB1) for the common search space CSS in time domain, and a cyclic redundancy check (CRC) of the PDCCH transmitted in the common search space CSS is scrambled by at least one of the P-RNTI, the RA-RNTI, the MsgB-RNTI, or the TC-RNTI, the terminal preferentially monitors the PDCCH scrambled by the P-RNTI, the RA-RNTI, the MsgB-RNTI, or the TC-RNTI, and does not transmit the PRACH. Otherwise, if the cyclic redundancy check CRC of the PDCCH transmitted in the common search space is scrambled by other RNTIs, for example, the SI-RNTI, a C-RNTI (Cell RNTI), a CS-RNTI (Configured Scheduling RNTI), an MCS-C-RNTI (Modulation Coding Scheme Cell RNTI), an INT-RNTI (Interruption RNTI), an SFI-RNTI (Slot Format Indication RNTI), a TPC-PUSCH-RNTI (Transmit Power Control-PUSCH-RNTI), a TPC-PUCCH-RNTI (Transmit Power Control-PUCCH-RNTI), a TPC-SRS-RNTI (Transmit Power Control-SRS-RNTI), or a CI-RNTI (Cancellation Indication-RNTI), the terminal preferentially transmits the PRACH, and does not monitor the PDCCH.

Example 4

In the example 4, the uplink transmission of the terminal includes a valid RO for a PRACH; and the downlink transmission of the terminal includes transmission of a terminal-specific downlink transmission configuration.

For example, the transmission of the terminal-specific downlink transmission configuration may include at least one of the following: PDCCH monitoring, an SPS PDSCH, a CSI-RS, or a TRS.

For example, for a resource collision in the example 4, the terminal behavior may include any one of the following:

Opt5-1: If a resource collision exists between downlink transmission and uplink transmission of the terminal in time domain, the terminal may consider that the resource collision is caused by a wrong configuration of the network. In this case, the terminal does not expect that a resource overlap of at least one symbol exists between the downlink transmission configured by the network and the valid RO for the PRACH.

For example, the terminal does not expect that a resource overlap of at least one symbol exists between the downlink transmission configured by received terminal-specific higher layer signaling (UE-dedicated RRC signaling) and uplink transmission.

Opt5-2: The terminal always transmits the PRACH.

For example, the terminal always preferentially transmits the PRACH.

For example, the terminal preferentially performs the uplink transmission based on the processing capability of the terminal. This is consistent with the terminal processing behavior in Opt3-3. In other words, in a case that the processing capability of the terminal is poor, the terminal always preferentially transmits the PRACH.

Opt5-3: Depending on implementation of the terminal, the terminal may determine to transmit the PRACH or receive the downlink transmission.

Example 5

In the example 5, the uplink transmission of the terminal includes any one of the following:

uplink transmission dynamically scheduled by a DCI format;

an uplink symbol or a flexible symbol indicated by a DCI format; and uplink transmission configured by higher layer semi-persistent signaling.

The downlink transmission of the terminal includes a synchronization signal and physical broadcast channel block SSB.

For example, the uplink transmission dynamically scheduled by the DCI format, or the uplink symbol or the flexible symbol indicated by the DCI format may include at least one of the following: a PRACH triggered by PDCCH order, a PUSCH, a PUCCH, a SRS, or a DCI format 2_0 indicating UL or flexible.

For example, the uplink transmission configured by the higher layer semi-persistent signaling may include at least one of the following: uplink configured grant (PUSCH) transmission, a PUCCH, or an SRS.

For example, for a resource collision in the example 5, the terminal behavior may include any one of the following:

Opt6-1: In a case that a preset condition is met, the terminal receives the SSB, and does not perform the uplink transmission. This is similar to the terminal behavior in Opt3-1. Otherwise, the terminal does not receive the SSB, and may perform the uplink transmission, or the terminal may determine, depending on implementation of the terminal, whether to receive the SSB or perform the uplink transmission.

For example, the SSB-MTC in example 5 is configured by at least one of the following:

SIB2, SIB4, ReconfigurationWithSync of CellGroupConfig, MeasIdleConfig, MeasIdleConfig SIB-r16 in RRC release or SIB11, and MeasObjectNR.

For example, to avoid the resource collision in the example 5, the terminal does not expect that a resource overlap of at least one symbol exists between the uplink transmission dynamically scheduled by the received DCI format and the SSB; and/or the terminal does not expect that a resource overlap of at least one symbol exists between the uplink symbol or flexible symbol indicated by the received DCI format and the SSB.

Opt6-2: The terminal always receives the SSB.

For example, in step 202*e*, the terminal also preferentially receives the SSB in a case that the uplink transmission of the terminal includes the uplink transmission dynamically scheduled by the DCI format, or the uplink symbol or flexible symbol indicated by the DCI format, besides that the terminal preferentially transmits the SSB in a case that the uplink transmission of the terminal does not include the valid RO for the PRACH.

For example, step 202*e* may further include the following step:

in a case that the uplink transmission includes the uplink transmission dynamically scheduled by the DCI format or the uplink symbol or flexible symbol indicated by the DCI format, the terminal preferentially receives the SSB.

It may be understood that, with reference to the example 2 and example 5, a complete step of step 202*e* is:

in a case that the uplink transmission of the terminal meets either of the following, the terminal preferentially receives the SSB:

the uplink transmission of the terminal includes the valid RO for the PRACH; or the uplink transmission of the terminal includes: the uplink transmission dynamically scheduled by the DCI format, or the uplink symbol or flexible symbol indicated by the DCI format.

Opt6-3: The terminal always preferentially performs the uplink transmission.

For example, the step of performing the terminal behavior may include step 202*f*, that is, the terminal preferentially performs the uplink transmission based on the processing capability of the terminal.

Opt6-4: Depending on implementation of the terminal, the terminal may determine to perform the uplink transmission or receive the SSB.

In the transmission control method provided in this embodiment of this application, a processing mechanism is defined for the HD-FDD terminal when a resource collision exists between downlink transmission in a cell-specific configuration of the terminal and uplink transmission in the cell-specific configuration in time domain; and in a case that the reduced-capability terminal maintains a normal connection to the base station by using the PRACH, the terminal behavior is optimized, so that when a resource collision exists between the uplink transmission and the downlink transmission, a correct terminal behavior can be performed. Therefore, communication stability and transmission efficiency of the terminal are improved.

It should be noted that the transmission control method provided in this embodiment of this application may be performed by a transmission control apparatus, or a control module for performing the transmission control method in the transmission control apparatus. A transmission control apparatus provided in an embodiment of this application is described by assuming that the transmission control method in this embodiment of this application is performed by the transmission control apparatus.

Figure 5:
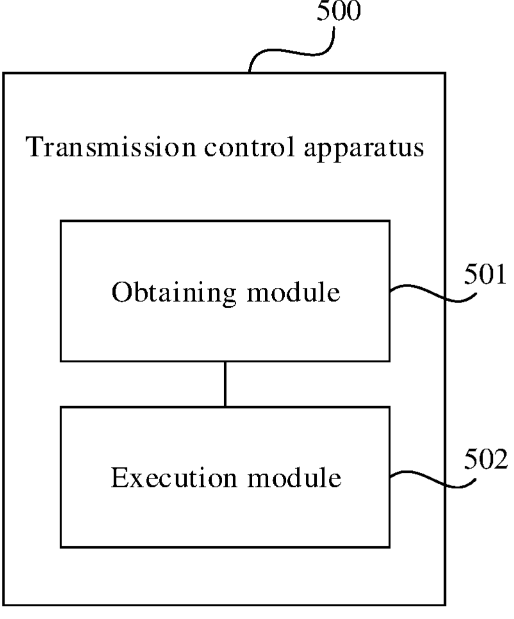
FIG. 5 is a schematic diagram of a structure of a transmission control apparatus according to an embodiment of this application.

FIG. 5 shows a transmission control apparatus provided in an embodiment of this application. The apparatus 500 includes an obtaining module 501 and an execution module 502. The obtaining module 501 is configured to obtain target information in a case that a resource collision exists between uplink transmission and downlink transmission of a terminal in time domain. The execution module 502 is configured to perform a corresponding terminal behavior based on the target information obtained by the obtaining module 501, where the terminal is a terminal having a half-duplex frequency division duplex HD-FDD capability, and the target information includes at least one of the following: a configuration of a base station or a processing capability of the terminal.

Optionally, the uplink transmission includes a physical random access channel PRACH.

Optionally, the uplink transmission includes any one of the following: uplink transmission dynamically scheduled by a DCI format, an uplink symbol or a flexible symbol indicated by a DCI format, and uplink transmission configured by higher layer semi-persistent signaling; and the downlink transmission includes a synchronization signal and physical broadcast channel block SSB.

Optionally, the uplink transmission includes a valid RO for the PRACH; and the downlink transmission includes any one of the following: downlink transmission dynamically scheduled by a DCI format; a downlink symbol indicated by a DCI format; and a flexible symbol indicated by a DCI format.

Optionally, the PRACH includes a first-part PRACH and a second-part PRACH, where the first-part PRACH includes symbols of the PRACH in a target time period; duration of the target time period is target duration, and the target duration is Tproc,2; a start point of the target time period is a last symbol of a target CORESET; the target CORESET includes either of the following: a CORESET in which a downlink symbol or a flexible symbol indicated by a DCI format detected by the terminal is located and a CORESET in which downlink transmission scheduled by a DCI format detected by the terminal is located; and the second-part PRACH includes: a PRACH part other than the first-part PRACH in the PRACH.

Optionally, the execution module 502 is configured to: if the terminal meets a timeline for canceling the entire uplink transmission, receive, for the terminal, the downlink transmission, and cancel transmission of the PRACH; otherwise, skip receiving, for the terminal, the downlink transmission; or the execution module 502 is further configured to: if the terminal meets a timeline for canceling the entire uplink transmission, skip receiving, for the terminal, the downlink transmission, and skip transmitting the PRACH; otherwise, skip receiving, for the terminal, the downlink transmission, where that the terminal meets a timeline for canceling the entire uplink transmission includes: a difference between a time when the terminal transmits a first symbol of the PRACH and a time when the terminal detects the last symbol of the target CORESET is greater than or equal to the target duration.

Optionally, the execution module 502 is configured to: if the terminal meets a timeline for canceling the entire uplink transmission, skip receiving, for the terminal, the downlink transmission, and cancel transmission of the PRACH; otherwise, skip receiving, for the terminal, the downlink transmission; or the execution module 502 is further configured to: if the terminal does not meet a timeline for canceling the entire uplink transmission, skip receiving, for the terminal, the downlink transmission, and cancel transmission of the second-part PRACH; otherwise, skip receiving, for the terminal, the downlink transmission; or the execution module 502 is further configured to: if the terminal meets a timeline for canceling the entire uplink transmission, receive, for the terminal, the downlink transmission, and cancel transmission of the PRACH; otherwise, skip receiving, for the terminal, the downlink transmission; or the execution module 502 is further configured to: if the terminal does not meet a timeline for canceling the entire uplink transmission, receive, for the terminal, the downlink transmission, and cancel transmission of the second-part PRACH; otherwise, skip receiving, for the terminal, the downlink transmission, where that the terminal meets a timeline for canceling the entire uplink transmission includes: a difference between a time when the terminal transmits a first symbol of the PRACH and a time when the terminal detects the last symbol of the target CORESET is greater than or equal to the target duration.

Optionally, the uplink transmission includes a valid RO for the PRACH; and the downlink transmission includes an SSB.

Optionally, the execution module 502 is configured to: in a case that the SSB meets at least one of the following, receive, for the terminal, the downlink transmission, and skip performing the uplink transmission; otherwise, skip receiving, for the terminal, the downlink transmission: the SSB is a synchronization signal and physical broadcast channel block indicated by the base station for the terminal by using a system information block SIB1; or the SSB is an SSB configured by an SSB measurement timing configuration SSB-MTC.

Optionally, the terminal does not expect that a resource overlap of at least one symbol exists between the uplink transmission dynamically scheduled by the received DCI format and the SSB; and/or the terminal does not expect that a resource overlap of at least one symbol exists between the uplink symbol or flexible symbol indicated by the received DCI format and the SSB.

Optionally, the execution module 502 is configured to preferentially receive, for the terminal, the SSB in a case that the uplink transmission meets either of the following: the uplink transmission does not include the valid RO for the PRACH; or the uplink transmission includes the uplink transmission dynamically scheduled by the DCI format or the uplink symbol or flexible symbol indicated by the DCI format.

Optionally, the uplink transmission includes a valid RO for the PRACH; and the downlink transmission includes a control resource set CORESET configured by system information for a common search space CSS.

Optionally, the execution module 502 is configured to: if the CORESET is associated with at least one of the following CSSs, monitor, for the terminal, a physical downlink control channel PDCCH in the CORESET, and skip sending the PRACH; otherwise, skip monitoring, by the terminal, the CORESET: a Type0 PDCCH CSS; a Type0A PDCCH CSS; a Type1 PDCCH CSS; or a Type2 PDCCH CSS.

Optionally, the execution module 502 is configured to: if the CORESET includes a target PDCCH, preferentially monitor, for the terminal, the target PDCCH, and skip transmitting the PRACH; otherwise, skip monitoring, by the terminal, the target PDCCH, where the target PDCCH is a PDCCH scrambled by at least one of the following radio network temporary identifiers RNTIs: a P-RNTI; an SI-RNTI; an RA-RNTI; an MsgB-RNTI; or a TC-RNTI.

Optionally, the uplink transmission includes a valid RO for the PRACH; and the downlink transmission includes transmission of a terminal-specific downlink transmission configuration.

Optionally, the execution module 502 is configured to preferentially perform, for the terminal, the uplink transmission based on the processing capability of the terminal.

Optionally, the terminal does not expect that a resource overlap of at least one symbol exists between the downlink transmission configured by the received DCI format and the uplink transmission; and/or the terminal does not expect that a resource overlap of at least one symbol exists between a downlink transmission direction indicated by the received DCI format and the uplink transmission; and/or the terminal does not expect that a resource overlap of at least one symbol exists between the flexible symbol indicated by the received DCI format and the uplink transmission.

According to the transmission control apparatus provided in this embodiment of this application, a processing mechanism is defined for the HD-FDD terminal when a resource collision exists between downlink transmission in a cell-specific configuration of the terminal and uplink transmission in the cell-specific configuration in time domain; and in a case that the reduced-capability terminal maintains a normal connection to the base station by using the PRACH, the terminal behavior is optimized, so that when a resource collision exists between the uplink transmission and the downlink transmission, a correct terminal behavior can be performed. Therefore, communication stability and transmission efficiency of the terminal are improved.

The transmission control apparatus in this embodiment of this application may be an apparatus, an apparatus with an operating system or an electronic device, or may be a component, an integrated circuit, or a chip in the terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The transmission control apparatus provided in this embodiment of this application can implement each process implemented by the method embodiments in FIG. 1 to FIG. 4B, with the same technical effect achieved. To avoid repetition, details are not described herein again.

Figure 6:
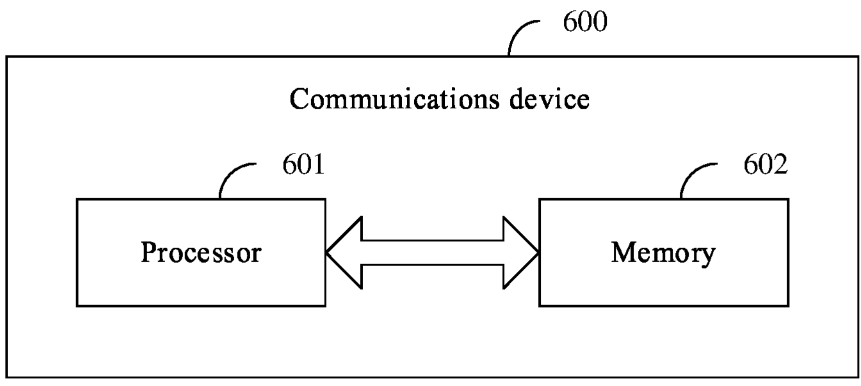
FIG. 6 is a schematic diagram of a structure of a communications device according to an embodiment of this application.

Optionally, as shown in FIG. 6, an embodiment of this application further provides a communications device 600, including a processor 601, a memory 602, and a program or instructions stored in the memory 602 and executable on the processor 601. For example, when the communications device 600 is a terminal, and the program or instructions are executed by the processor 601, each process of the foregoing embodiment of the transmission control method is implemented, with the same technical effect achieved. When the communications device 600 is a network-side device, and the program or instructions are executed by the processor 601, each process of the foregoing embodiment of the transmission control method is implemented, with the same technical effect achieved. To avoid repetition, details are not described herein again.

Figure 7:
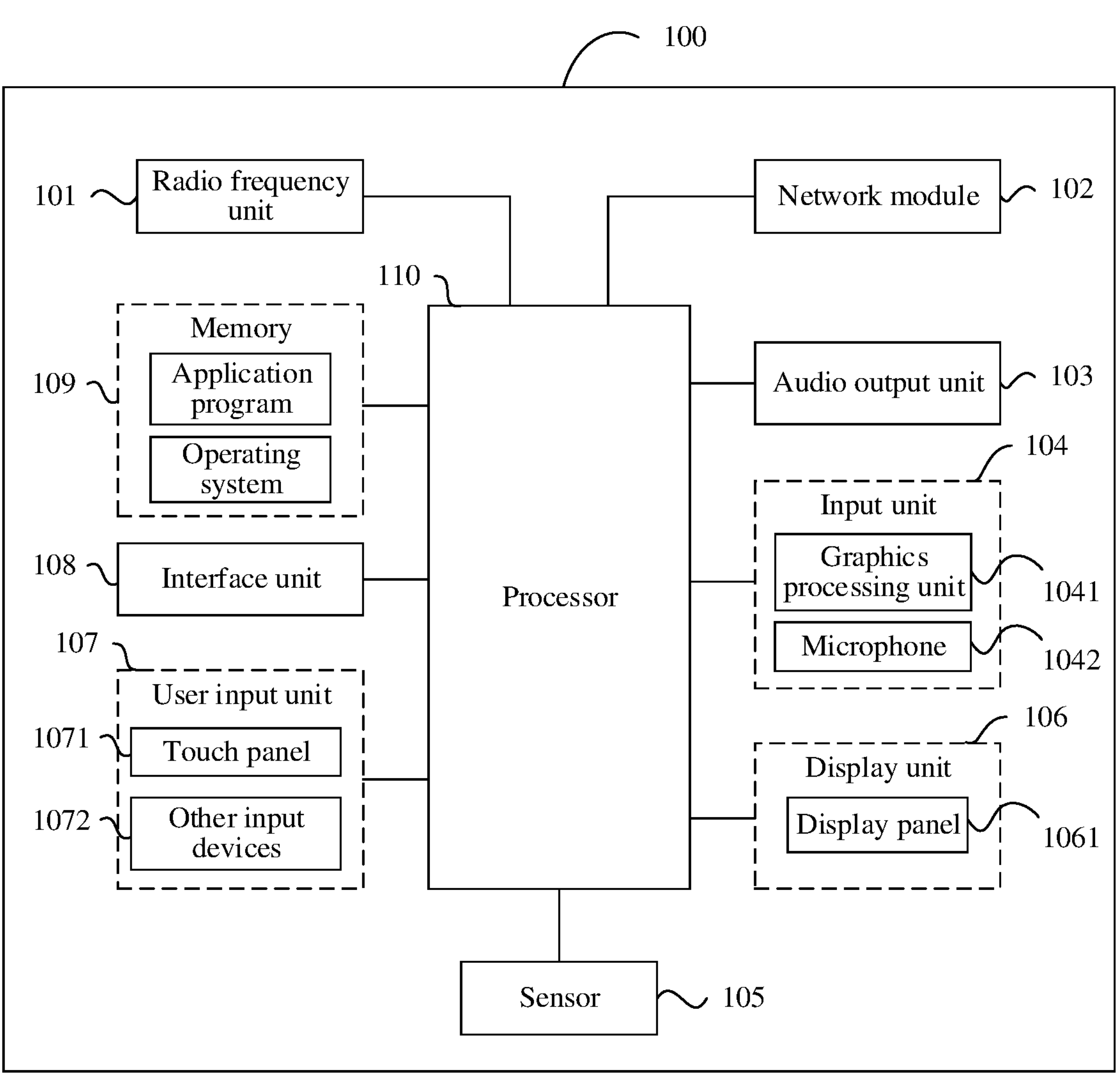
FIG. 7 is a schematic diagram of a hardware structure of a terminal according to an embodiment of this application.

An embodiment of this application further provides a terminal, including a processor and a communications interface. The processor is configured to obtain target information in a case that a resource collision exists between uplink transmission and downlink transmission of the terminal in time domain. The communications interface is configured to perform a corresponding terminal behavior based on the target information. The terminal embodiment corresponds to the foregoing terminal-side method embodiment, and each implementation process and implementation of the foregoing method embodiment can be applied to the terminal embodiment, with the same technical effect achieved. Optionally, FIG. 7 is a schematic diagram of a hardware structure of a terminal for implementing an embodiment of this application.

The terminal 100 includes but is not limited to at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (for example, a battery) supplying power to all components. Optionally, the power supply may be logically connected to the processor 110 through a power management system. In this way, functions such as charge management, discharge management, and power consumption management are implemented by using the power management system. The terminal structure shown in FIG. 7 does not constitute a limitation on the terminal. The terminal may include more or fewer components than those shown in the figure, or some components are combined, or component arrangements are different. Details are not described herein again.

It should be understood that, in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 101 sends the downlink data to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may primarily include a program or instruction storage area and a data storage area. The program or instruction storage area may store an operating system, an application program or instructions (such as an audio play function and an image play function) required by at least one function, and the like. In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 110 may include one or more processing units. Optionally, the processor 110 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively be not integrated in the processor 110.

The processor 110 is configured to obtain target information in a case that a resource collision exists between uplink transmission and downlink transmission of the terminal in time domain. The radio frequency unit 101 is configured to perform a corresponding terminal behavior based on the target information obtained by the processor 110, where the terminal is a terminal having a half-duplex frequency division duplex HD-FDD capability, and the target information includes at least one of the following: a configuration of a base station or a processing capability of the terminal.

Optionally, the radio frequency unit 101 is configured to: if the terminal meets a timeline for canceling the entire uplink transmission, receive, for the terminal, the downlink transmission, and cancel transmission of the PRACH; otherwise, skip receiving, for the terminal, the downlink transmission; or the radio frequency unit 101 is further configured to: if the terminal meets a timeline for canceling the entire uplink transmission, skip receiving, for the terminal, the downlink transmission, and skip transmitting the PRACH; otherwise, skip receiving, for the terminal, the downlink transmission, where that the terminal meets a timeline for canceling the entire uplink transmission includes: a difference between a time when the terminal transmits a first symbol of the PRACH and a time when the terminal detects the last symbol of the target CORESET is greater than or equal to the target duration.

Optionally, the radio frequency unit 101 is configured to: if the terminal meets a timeline for canceling the entire uplink transmission, skip receiving, for the terminal, the downlink transmission, and cancel transmission of the PRACH; otherwise, skip receiving, for the terminal, the downlink transmission; or the radio frequency unit 101 is further configured to: if the terminal does not meet a timeline for canceling the entire uplink transmission, skip receiving, for the terminal, the downlink transmission, and cancel transmission of the second-part PRACH; otherwise, skip receiving, for the terminal, the downlink transmission; or the radio frequency unit 101 is further configured to: if the terminal meets a timeline for canceling the entire uplink transmission, receive, for the terminal, the downlink transmission, and cancel transmission of the PRACH; otherwise, skip receiving, for the terminal, the downlink transmission; or the radio frequency unit 101 is further configured to: if the terminal does not meet a timeline for canceling the entire uplink transmission, receive, for the terminal, the downlink transmission, and cancel transmission of the second-part PRACH; otherwise, skip receiving, for the terminal, the downlink transmission, where that the terminal meets a timeline for canceling the entire uplink transmission includes: a difference between a time when the terminal transmits a first symbol of the PRACH and a time when the terminal detects the last symbol of the target CORESET is greater than or equal to the target duration.

Optionally, the radio frequency unit 101 is configured to: in a case that the SSB meets at least one of the following, receive, for the terminal, the downlink transmission, and skip performing the uplink transmission; otherwise, skip receiving, for the terminal, the downlink transmission: the SSB is a synchronization signal and physical broadcast channel block indicated by the base station for the terminal by using a system information block SIB1; or the SSB is an SSB configured by an SSB measurement timing configuration SSB-MTC.

Optionally, the radio frequency unit 101 is configured to preferentially receive, for the terminal, the SSB in a case that the uplink transmission meets either of the following: the uplink transmission does not include the valid RO for the PRACH; or the uplink transmission includes the uplink transmission dynamically scheduled by the DCI format or the uplink symbol or flexible symbol indicated by the DCI format.

Optionally, the radio frequency unit 101 is configured to: if the CORESET is associated with at least one of the following CSSs, monitor, for the terminal, a physical downlink control channel PDCCH in the CORESET, and skip sending the PRACH; otherwise, skip monitoring, by the terminal, the CORESET: a Type0 PDCCH CSS; a Type0A PDCCH CSS; a Type1 PDCCH CSS; or a Type2 PDCCH CSS.

Optionally, the radio frequency unit 101 is configured to: if the CORESET includes a target PDCCH, preferentially monitor, for the terminal, the target PDCCH, and skip transmitting the PRACH; otherwise, skip monitoring, by the terminal, the target PDCCH, where the target PDCCH is a PDCCH scrambled by at least one of the following radio network temporary identifiers RNTIs: a P-RNTI; an SI-RNTI; an RA-RNTI; an MsgB-RNTI; or a TC-RNTI.

Optionally, the radio frequency unit 101 is configured to preferentially perform, for the terminal, the uplink transmission based on the processing capability of the terminal.

According to the terminal provided in this embodiment of this application, a processing mechanism is defined for the HD-FDD terminal when a resource collision exists between downlink transmission in a cell-specific configuration of the terminal and uplink transmission in the cell-specific configuration in time domain; and in a case that the reduced-capability terminal maintains a normal connection to the base station by using the PRACH, the terminal behavior is optimized, so that when a resource collision exists between the uplink transmission and the downlink transmission, a correct terminal behavior can be performed. Therefore, communication stability and transmission efficiency of the terminal are improved.

An embodiment of this application further provides a non-transitory readable storage medium. The non-transitory readable storage medium stores a program or instructions. When the program or instructions are executed by a processor, each process of the foregoing embodiment of the transmission control method is implemented, with the same technical effect achieved. To avoid repetition, details are not described herein again.

The processor is a processor in the terminal in the foregoing embodiment. The non-transitory readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the foregoing embodiment of the transmission control method, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term “comprise”, “include”, or any variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by “includes a . . . ” does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a non-transitory storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A transmission control method, comprising:

in a case that a resource collision exists between uplink transmission and downlink transmission of a terminal in time domain, obtaining, by the terminal, target information; and performing, by the terminal, a corresponding terminal behavior based on the target information, wherein the target information comprises at least one of following: a configuration of a base station or a processing capability of the terminal; and the terminal is a terminal having a half-duplex frequency division duplex (HD-FDD) capability; wherein in a case that the downlink transmission comprises a synchronization signal and physical broadcast channel block (SSB) indicated by the base station for the terminal by using a ssb-PositionsInBurst in system information block (SIB1), receiving, by the terminal, the SSB, and skipping performing the uplink transmission; otherwise, skipping receiving, by the terminal, the SSB, wherein the uplink transmission comprises any one of following: a physical random access channel (PRACH) triggered by physical downlink control channel (PDCCH) order, and uplink transmission configured by higher layer semi-persistent signaling;

or in a case that the uplink transmission comprises the PRACH triggered by PDCCH order, preferentially receiving, by the terminal, a SSB; the SSB comprises that the SSB indicate to the terminal via ssb-PositionsInBurst in SIB1;

or depending on implementation of the terminal, determining, by the terminal, to transmit the uplink transmission or receive the downlink transmission; wherein the uplink transmission comprises: valid RACH occasion (RO) for the PRACH, and the downlink transmission comprises: downlink transmission dynamically scheduled by a downlink control information (DCI) format.

2. The method according to claim 1, wherein the PRACH comprises a first-part PRACH and a second-part PRACH, wherein the first-part PRACH comprises symbols of the PRACH in a target time period;

duration of the target time period is target duration, and the target duration is Tproc,2;

a start point of the target time period is a last symbol of a target CORESET;

the target CORESET comprises either of following: a CORESET in which a downlink symbol or a flexible symbol indicated by a DCI format detected by the terminal is located and a CORESET in which downlink transmission scheduled by a DCI format detected by the terminal is located; and the second-part PRACH comprises: a PRACH part other than the first-part PRACH in the PRACH.

3. The method according to claim 2, wherein the terminal does not indicate support for a partial cancellation capability; and the performing, by the terminal, a corresponding terminal behavior based on the target information comprises:

if the terminal meets a timeline for canceling entire uplink transmission, receiving, by the terminal, the downlink transmission, and canceling transmission of the PRACH; otherwise, skipping receiving, by the terminal, the downlink transmission; or if the terminal meets a timeline for canceling entire uplink transmission, skipping receiving, by the terminal, the downlink transmission, and skipping transmitting the PRACH; otherwise, skipping receiving, by the terminal, the downlink transmission, wherein that the terminal meets a timeline for canceling entire uplink transmission comprises: a difference between a time when the terminal transmits a first symbol of the PRACH and a time when the terminal detects the last symbol of the target CORESET is greater than or equal to the target duration.

4. The method according to claim 2, wherein the terminal indicates support for a partial cancellation capability; and the performing, by the terminal, a corresponding terminal behavior based on the target information comprises:

if the terminal meets a timeline for canceling entire uplink transmission, skipping receiving, by the terminal, the downlink transmission, and canceling transmission of the PRACH; otherwise, skipping receiving, by the terminal, the downlink transmission;

or if the terminal does not meet a timeline for canceling entire uplink transmission, skipping receiving, by the terminal, the downlink transmission, and canceling transmission of the second-part PRACH; otherwise, skipping receiving, by the terminal, the downlink transmission;

or if the terminal meets a timeline for canceling entire uplink transmission, receiving, by the terminal, the downlink transmission, and canceling transmission of the PRACH; otherwise, skipping receiving, by the terminal, the downlink transmission;

or if the terminal does not meet a timeline for canceling entire uplink transmission, receiving, by the terminal, the downlink transmission, and canceling transmission of the second-part PRACH; otherwise, skipping receiving, by the terminal, the downlink transmission, wherein that the terminal meets a timeline for canceling entire uplink transmission comprises: a difference between a time when the terminal transmits a first symbol of the PRACH and a time when the terminal detects the last symbol of the target CORESET is greater than or equal to the target duration.

5. The method according to claim 1, wherein the terminal does not expect that a resource overlap of at least one symbol exists between the PRACH triggered by the PDCCH order and the SSB.

6. A terminal, comprising a processor, a memory, and a program or instructions stored in the memory and executable on the processor, wherein the program or instructions, when executed by the processor, causes the terminal to perform:

in a case that a resource collision exists between uplink transmission and downlink transmission of a terminal in time domain, obtaining, by the terminal, target information; and performing, by the terminal, a corresponding terminal behavior based on the target information, wherein the target information comprises at least one of following: a configuration of a base station or a processing capability of the terminal; and the terminal is a terminal having an HD-FDD capability; wherein in a case that the downlink transmission comprises a synchronization signal and physical broadcast channel block (SSB) indicated by the base station for the terminal by using a ssb-PositionsInBurst in system information block (SIB1), receiving, by the terminal, the SSB, and skipping performing the uplink transmission; otherwise, skipping receiving, by the terminal, the SSB, wherein the uplink transmission comprises any one of following: a physical random access channel (PRACH) triggered by physical downlink control channel (PDCCH) order, and uplink transmission configured by higher layer semi-persistent signaling;

or in a case that the uplink transmission comprises the PRACH triggered by PDCCH order, preferentially receiving, by the terminal, a SSB; the SSB comprises that the SSB indicate to the terminal via ssb-PositionsInBurst in SIB1;

or depending on implementation of the terminal, determining, by the terminal, to transmit the uplink transmission or receive the downlink transmission; wherein the uplink transmission comprises: valid RACH occasion (RO) for the PRACH, and the downlink transmission comprises: downlink transmission dynamically scheduled by a downlink control information (DCI) format.

7. The terminal according to claim 6, wherein the PRACH comprises a first-part PRACH and a second-part PRACH, wherein the first-part PRACH comprises symbols of the PRACH in a target time period;

duration of the target time period is target duration, and the target duration is Tproc,2;

a start point of the target time period is a last symbol of a target CORESET;

the target CORESET comprises either of following: a CORESET in which a downlink symbol or a flexible symbol indicated by a DCI format detected by the terminal is located and a CORESET in which downlink transmission scheduled by a DCI format detected by the terminal is located; and the second-part PRACH comprises: a PRACH part other than the first-part PRACH in the PRACH.

8. The terminal according to claim 7, wherein the terminal does not indicate support for a partial cancellation capability; and the program or instructions, when executed by the processor, causes the terminal to perform:

if the terminal meets a timeline for canceling entire uplink transmission, receiving, by the terminal, the downlink transmission, and canceling transmission of the PRACH; otherwise, skipping receiving, by the terminal, the downlink transmission; or if the terminal meets a timeline for canceling entire uplink transmission, skipping receiving, by the terminal, the downlink transmission, and skipping transmitting the PRACH; otherwise, skipping receiving, by the terminal, the downlink transmission, wherein that the terminal meets a timeline for canceling entire uplink transmission comprises: a difference between a time when the terminal transmits a first symbol of the PRACH and a time when the terminal detects the last symbol of the target CORESET is greater than or equal to the target duration.

9. The terminal according to claim 7, wherein the terminal indicates support for a partial cancellation capability; and the program or instructions, when executed by the processor, causes the terminal to perform:

if the terminal meets a timeline for canceling entire uplink transmission, skipping receiving, by the terminal, the downlink transmission, and canceling transmission of the PRACH; otherwise, skipping receiving, by the terminal, the downlink transmission;

or if the terminal does not meet a timeline for canceling entire uplink transmission, skipping receiving, by the terminal, the downlink transmission, and canceling transmission of the second-part PRACH; otherwise, skipping receiving, by the terminal, the downlink transmission;

or if the terminal meets a timeline for canceling entire uplink transmission, receiving, by the terminal, the downlink transmission, and canceling transmission of the PRACH; otherwise, skipping receiving, by the terminal, the downlink transmission;

or if the terminal does not meet a timeline for canceling entire uplink transmission, receiving, by the terminal, the downlink transmission, and canceling transmission of the second-part PRACH; otherwise, skipping receiving, by the terminal, the downlink transmission, wherein that the terminal meets a timeline for canceling entire uplink transmission comprises: a difference between a time when the terminal transmits a first symbol of the PRACH and a time when the terminal detects the last symbol of the target CORESET is greater than or equal to the target duration.

10. The terminal according to claim 6, wherein the terminal does not expect that a resource overlap of at least one symbol exists between the PRACH triggered by the PDCCH order and the SSB.

11. A non-transitory readable storage medium, wherein the non-transitory readable storage medium stores a program or instructions, and the program or instructions, when executed by a processor of a terminal, causes the terminal to perform:

in a case that a resource collision exists between uplink transmission and downlink transmission of a terminal in time domain, obtaining, by the terminal, target information; and performing, by the terminal, a corresponding terminal behavior based on the target information, wherein the target information comprises at least one of following: a configuration of a base station or a processing capability of the terminal; and the terminal is a terminal having an HD-FDD capability; wherein in a case that the downlink transmission comprises a synchronization signal and physical broadcast channel block (SSB) indicated by the base station for the terminal by using a ssb-PositionsInBurst in system information block (SIB1), receiving, by the terminal, the SSB, and skipping performing the uplink transmission; otherwise, skipping receiving, by the terminal, the SSB, wherein the uplink transmission comprises any one of following: a physical random access channel PRACH) triggered by physical downlink control channel (PDCCH) order, and uplink transmission configured by higher layer semi-persistent signaling;

or in a case that the uplink transmission comprises the PRACH triggered by PDCCH order, preferentially receiving, by the terminal, a SSB; the SSB comprises that the SSB indicate to the terminal via ssb-PositionsInBurst in SIB1;

or depending on implementation of the terminal, determining, by the terminal, to transmit the uplink transmission or receive the downlink transmission; wherein the uplink transmission comprises: valid RACH occasion (RO) for the PRACH, and the downlink transmission comprises: downlink transmission dynamically scheduled by a downlink control information (DCI) format.

12. The non-transitory readable storage medium according to claim 11, wherein the PRACH comprises a first-part PRACH and a second-part PRACH, wherein the first-part PRACH comprises symbols of the PRACH in a target time period;

duration of the target time period is target duration, and the target duration is Tproc,2;

a start point of the target time period is a last symbol of a target CORESET;

the target CORESET comprises either of the following: a CORESET in which a downlink symbol or a flexible symbol indicated by a DCI format detected by the terminal is located and a CORESET in which downlink transmission scheduled by a DCI format detected by the terminal is located; and the second-part PRACH comprises: a PRACH part other than the first-part PRACH in the PRACH.

13. The non-transitory readable storage medium according to claim 12, wherein the terminal does not indicate support for a partial cancellation capability; and the program or instructions, when executed by the processor, causes the terminal to perform:

if the terminal meets a timeline for canceling entire uplink transmission, receiving, by the terminal, the downlink transmission, and canceling transmission of the PRACH; otherwise, skipping receiving, by the terminal, the downlink transmission; or if the terminal meets a timeline for canceling entire uplink transmission, skipping receiving, by the terminal, the downlink transmission, and skipping transmitting the PRACH; otherwise, skipping receiving, by the terminal, the downlink transmission, wherein that the terminal meets a timeline for canceling entire uplink transmission comprises: a difference between a time when the terminal transmits a first symbol of the PRACH and a time when the terminal detects the last symbol of the target CORESET is greater than or equal to the target duration.

14. The non-transitory readable storage medium according to claim 12, wherein the terminal indicates support for a partial cancellation capability; and the program or instructions, when executed by the processor, causes the terminal to perform:

if the terminal meets a timeline for canceling entire uplink transmission, skipping receiving, by the terminal, the downlink transmission, and canceling transmission of the PRACH; otherwise, skipping receiving, by the terminal, the downlink transmission;

or if the terminal does not meet a timeline for canceling entire uplink transmission, skipping receiving, by the terminal, the downlink transmission, and canceling transmission of the second-part PRACH; otherwise, skipping receiving, by the terminal, the downlink transmission;

or if the terminal meets a timeline for canceling entire uplink transmission, receiving, by the terminal, the downlink transmission, and canceling transmission of the PRACH; otherwise, skipping receiving, by the terminal, the downlink transmission;

or if the terminal does not meet a timeline for canceling entire uplink transmission, receiving, by the terminal, the downlink transmission, and canceling transmission of the second-part PRACH; otherwise, skipping receiving, by the terminal, the downlink transmission, wherein that the terminal meets a timeline for canceling entire uplink transmission comprises: a difference between a time when the terminal transmits a first symbol of the PRACH and a time when the terminal detects the last symbol of the target CORESET is greater than or equal to the target duration.

15. The non-transitory readable storage medium according to claim 11, wherein the terminal does not expect that a resource overlap of at least one symbol exists between the PRACH triggered by the PDCCH order and the SSB.

* * * * *